United States Patent
Bar-Yaakov et al.

(10) Patent No.: US 8,524,813 B2
(45) Date of Patent: Sep. 3, 2013

(54) FLAME-RETARDED COMPOSITIONS OF STYRENE-CONTAINING POLYMERS

(75) Inventors: Yoav Bar-Yaakov, Lehavim (IL); Ita Finberg, Be'er Sheva (IL); Rachel Shtekler, Shafir (IL); Pierre Georlette, Omer (IL)

(73) Assignee: Bromine Compounds Ltd., Be'er Sheva (IL)

( * ) Notice: Subject to any disclaimer, the term of this patent is extended or adjusted under 35 U.S.C. 154(b) by 6 days.

(21) Appl. No.: 12/737,541

(22) PCT Filed: Jul. 22, 2009

(86) PCT No.: PCT/IL2009/000720
§ 371 (c)(1),
(2), (4) Date: Mar. 15, 2011

(87) PCT Pub. No.: WO2010/010561
PCT Pub. Date: Jan. 28, 2010

(65) Prior Publication Data
US 2011/0160362 A1    Jun. 30, 2011

Related U.S. Application Data

(60) Provisional application No. 61/082,518, filed on Jul. 22, 2008.

(51) Int. Cl.
*C08K 5/3477* (2006.01)
*C08K 5/34924* (2006.01)

(52) U.S. Cl.
USPC ............ 524/101; 524/409; 524/469; 524/515

(58) Field of Classification Search
USPC ...................................................... 524/101
See application file for complete search history.

(56) References Cited

U.S. PATENT DOCUMENTS

| | | | |
|---|---|---|---|
| 4,386,203 A | 5/1983 | Naarmann et al. | |
| 5,387,636 A | 2/1995 | Landry et al. | |
| 5,907,040 A | 5/1999 | Nishibori et al. | |
| 5,965,731 A | 10/1999 | Ao et al. | |
| 6,075,142 A | 6/2000 | Nishibori et al. | |
| 6,503,988 B1 | 1/2003 | Kitahara et al. | |
| 2007/0225415 A1 | 9/2007 | Bar-Yaakov et al. | |

FOREIGN PATENT DOCUMENTS

| | | |
|---|---|---|
| EP | 0 527 493 | 2/1993 |
| JP | 2001-181469 | * 7/2001 |
| WO | WO 2005/120165 | 12/2005 |

OTHER PUBLICATIONS

International Search Report for PCT/IL2009/000720, mailed Nov. 2, 2009.
Written Opinion of the International Searching Authority for PCT/IL2009/000720, mailed Nov. 2, 2009.
International Preliminary Report on Patentability for PCT/IL2009/000720, dated May 23, 2010.
Database WPI Week 200173, Accession No. 2001-629206 & JP 2001-181469, (Jul. 3, 2001), Abstract.
Database WPI Week 200007, Accession No. 2000-075733 & JP 11-323064, (Nov. 26, 1999), Abstract.
Database WPI Week 199837, Accession No. 1998-434050 & JP 10-182905, (Jul. 7, 1998), Abstract.
Brydson, J.A., "Plastics Materials", Sixth Edition, 6 pages.
Optical Clarity of Fluoropolymers, Zeus Industrial Products, 9 pages, 2005.
http://www.plasma-us.com/246-0-polytetrafluourethylene-ptfe.html (visited Feb. 25, 2013).
http://www.ptonline.com/articles/polyphosphonate-new-flame-retardant-cousin-of-polycarbonate (visited Feb. 25, 2013).
Daihachi Flame Retardants, 2 pages.

* cited by examiner

Primary Examiner — Ling Choi
Assistant Examiner — Ronald Grinsted
(74) Attorney, Agent, or Firm — Nixon & Vanderhye P.C.

(57) ABSTRACT

A flame-retarded styrene-containing polymer composition, which comprises a styrene-containing polymer, tris(2,4,6-tribromophenoxy)-s-triazine, 0.5-1.7 wt % antimony trioxide, and an anti-dripping agent. The bromine content of the composition is generally in the range between 8 and 18 wt %. Additional brominated flame retarding agents may also be included in the composition.

21 Claims, 1 Drawing Sheet

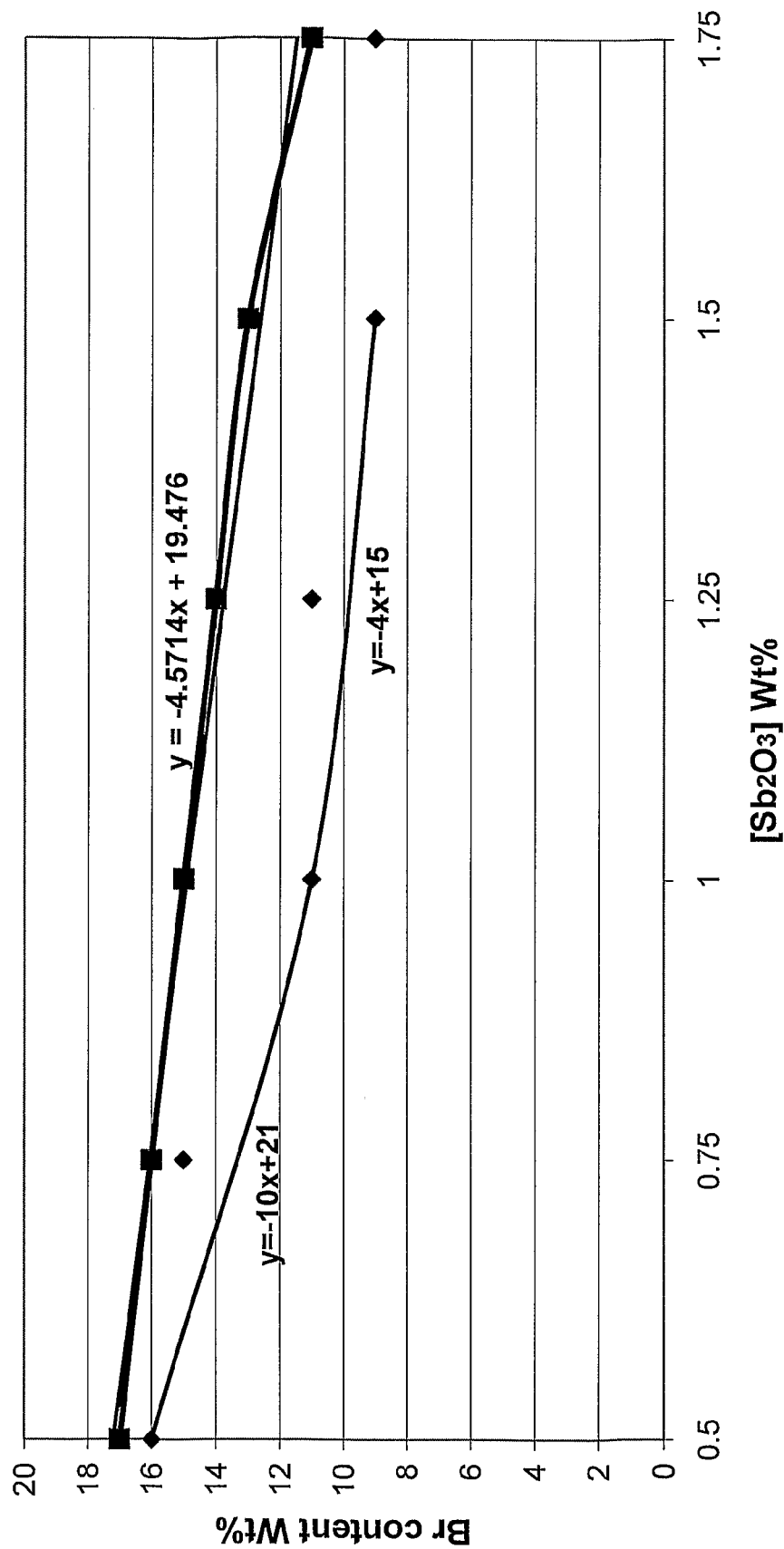

FLAME-RETARDED COMPOSITIONS OF STYRENE-CONTAINING POLYMERS

This application is the U.S. national phase of International Application No. PCT/IL2009/000720, filed 22 Jul. 2009, which designated the U.S. and claims the benefit of U.S. Provisional Application No. 61/082,518, filed 22 Jul. 2008, the entire contents of each of which are hereby incorporated by reference.

The flammability characteristics of plastic materials are quantifiable according to the method specified by Underwriter Laboratories standard UL 94. The UL 94 ratings are V-0, V-1, and V-2 (a detailed description of the relevant flammability tests is given hereinafter). A material assigned with the V-0 rating is considered to be the less flammable. For certain applications the lower V-2 rating is acceptable, whereas for other applications the more strict V-1 and V-0 ratings are needed.

Antimony trioxide is known to synergistically cooperate with brominated flame retardants in various polymeric formulations for attaining the desired UL 94 V-1 or V-0 ratings. In HIPS (high impact polystyrene) or ABS (acrylonitrile butadiene styrene copolymers), in order to effectively support the brominated flame retardant used, antimony trioxide must generally be present in a weight concentration within the range of about 2 to 6% relative to the total weight of the polymeric formulation. For example, in U.S. Pat. No. 5,387,636 and EP 527493 HIPS formulations are described that are flame retarded with decabromodiphenyl ethane, in combination with 4% (w/w) antimony trioxide. Other brominated flame retardants recommended for use in styrene copolymers are decabromodiphenyl oxide, brominated epoxy and tribromophenol end-capped brominated epoxy. These flame retarding agents are added to HIPS or ABS formulations in combination with an appreciable amount of antimony trioxide.

Thus, the use of a flame retardant system, which contains a brominated flame retardant such as those listed above, in combination with less than 2% antimony trioxide (weight percent relative to the total weight of the polymeric formulation), for effectively retarding the flammability of HIPS or ABS composition has been considered impractical, since in the presence of such a small amount of said synergist the amount of the brominated compound needed to obtain UL 94 V-1 or V-0 rating was considered to be unacceptably high, resulting in a final product having poor physical profile.

It is an aim of this invention to allow a significant reduction in the quantity of antimony trioxide needed to achieve UL 94 V-1 or V-0 ratings in styrene-containing polymers formulations. Such a reduction is beneficial since antimony trioxide is an expensive, highly dense additive, which tends to detrimentally affect the properties of the final plastics.

Tris(2,4,6-tribromophenoxy)-s-triazine is a brominated flame retardant with a bromine content of 67 wt %, and is represented by the following formula:

(Formula I)

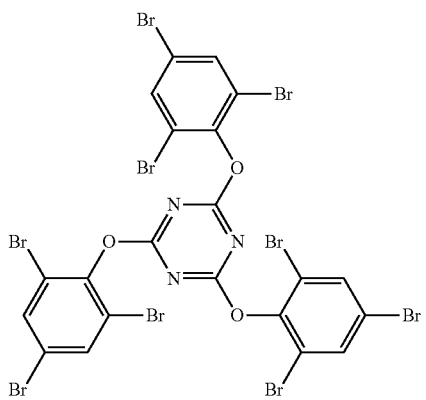

The preparation of tris(2,4,6-tribromophenoxy)-s-triazine is generally based on the reaction of cyanuric chloride with 2,4,6-tribromophenolate under various conditions well known in the art (see, for example, U.S. Pat. Nos. 5,907,040, 5,965,731 and 6,075,142). The flame retardant is also commercially available from ICL-IP under the name FR-245. The chemical name and FR-245 are interchangeably used herein.

One of the major uses of tris(2,4,6-tribromophenoxy)-s-triazine is for retarding the flammability of HIPS and ABS and their alloys. It is worth noting that the melting point of Tris(2,4,6-tribromophenoxy)-s-triazine is 230° C., which is significantly lower than the melting points of two other brominated flame retardants that are widely used in HIPS and ABS applications: decabromodiphenyl oxide and decabromodiphenyl ethane, which melt at 305° C. and 350° C., respectively.

The efficacy of the combination of tris(2,4,6-tribromophenoxy)-s-triazine and antimony trioxide for retarding the flammability of styrene-containing polymers is discussed in co-assigned PCT publication WO 2005/120165. Examples 1 to 3 of said publication show that when the concentration of the bromine provided by tris(2,4,6-tribromophenoxy)-s-triazine is 10% (w/w), then an amount of 2.5% of antimony trioxide is sufficient for allowing the HIPS-based formulation to meet the UL 94 V-0 rating. Reference Example 12 of WO 2005/120165 illustrates that an attempt to reduce the concentration of antimony trioxide to 1 wt % did not result in HIPS formulation with an acceptable degree of flame retardancy. All percentages expressed herein are by weight relative to the total weight of the flame retarded composition, unless otherwise indicated.

It has now been found that compositions of styrene-containing polymers, and specifically, HIPS and ABS-based formulations, can be flame retarded with tris(2,4,6-tribromophenoxy)-s-triazine to pass the stringent UL 94 V-1 or V-0 ratings, even when the antimony trioxide synergist is present in said compositions at a concentration as low as 0.5-1.7 wt %, and more preferably between 0.75 and 1.5 wt % and even more preferably between 1.0 and 1.5 wt %. Despite the low concentration of the synergist, the amount of tris(2,4,6-tribromophenoxy)-s-triazine within the composition is adjusted such that the bromine content of the styrene-containing polymer composition is within an acceptable range of 7 to 24 wt %, and preferably between 8 and 18 wt %, and more preferably between 11 and 18 wt % and even more preferably between 11 to 14.5 wt %, whereby the desired UL 94 V-1 or V-0 ratings are met. Our comparative studies reported in the Examples below show that the pair tris(2,4,6-tribromophenoxy)-s-triazine/antimony trioxide cooperates very effectively within the concentration ranges noted above; a similar behavior is not observed for the combinations of antimony trioxide with the powerful flame retardants decabromodiphenyl oxide and decabromodiphenyl ethane. These two compounds are sometimes abbreviated herein by means of their commercial names "FR 1210" (ICL-IP) and "S-8010" (Albemarle Corporation), respectively.

Hereinafter, the amount of bromine to be generated by a specific brominated flame retardant is conveniently indicated bromine$_{(FR\ name)}$. This amount serves as a measure for comparing between the efficacy of various flame retardant at a given concentration of antimony trioxide, indicating how much bromine is needed in order to allow the polymeric composition to pass the UL 94 V-1 or V-0 tests in the presence of said concentration of antimony trioxide (this concentration is abbreviated [$Sb_2O_3$]. It has been found that for the 1-1.5 wt % concentration range of antimony trioxide, the ratio Bromine$_{(FR\text{-}245)}$:[$Sb_2O_3$] that is required in order to allow the styrene-containing polymer compositions to meet the UL 94 V-1 and V-0 ratings is less than the corresponding ratios Bromine$_{(FR-1210)}$:[Sb$_2$O$_3$] and Bromine$_{(S-8010)}$:[Sb$_2$O$_3$]. For example, for HIPS composition having [Sb$_2$O$_3$] of 1.0 wt %, then the Bromine$_{(FR-245)}$ needed for securing UL 94 V-1 rating is only 11 wt %, whereas the Bromine$_{(FR-1210)}$ or Bromine$_{(S-8010)}$ are more than 18 wt %.

The results reported above for decabromodiphenyl oxide (FR 1210) and decabromodiphenyl ethane (S-8010) are indeed in agreement with the conventional wisdom in the art, according to which a brominated flame retardant in HIPS compositions needs to be supported by the presence of not less than 2 wt % of antimony trioxide. When a lesser amount of antimony trioxide is used, namely, when the concentration of antimony trioxide is reduced below 2 wt % (from 2 wt %→1.5 wt %→1.0 wt %→0.5 wt %), then the amount of bromine which must be supplied to the polymeric composition by the flame retardant for passing UL 94 V-1 or V-0 tests is expected to increase sharply. We have indeed observed such a sharp increase in HIPS compositions for both decabromodiphenyl oxide and decabromodiphenyl ethane, as shown by the table below:

| [Sb$_2$O$_3$] | Bromine$_{(FR-1210)}$ necessary for passing UL 94 V-1 | Bromine$_{(S-8010)}$ necessary for passing UL 94 V-1 |
| --- | --- | --- |
| 1.5 wt % | 14-15 wt % | 14-15 wt % |
| 1.0% | 18-19 wt % | 18-19 wt % |

Thus, in HIPS composition which are flame retarded by either decabromodiphenyl oxide or decabromodiphenyl ethane, a reduction at the content of the antimony trioxide from 1.5 to 1.0 wt % necessitates an appreciable increase of the amount of the bromine provided by the flame retardant in order to maintain the UL 94 V-1 or V-0 rating.

FR-245 exhibits different dependency on the concentration of antimony trioxide in the range between 0.5 and 1.5 wt %. Reducing the concentration of the antimony trioxide (from 1.5 wt %→1.0 wt %→0.5 wt %) necessitates, of course, a corresponding increase in the amount of bromine to be delivered by FR-245 for securing UL 94 ratings for the HIPS composition. However, the rate of increase of the amount bromine$_{(FR\ 245)}$ is fairly moderate, as opposed to the sharp increase observed for other commonly used brominated flame retardants as described above. As shown in more detail below, it has been found that for the interval 1.0-1.5 wt % antimony trioxide, the required amount of bromine$_{(FR\ 245)}$ may be adjusted according to a linear function with a slope of −4, which value is indicative of a reasonable rate of change.

According to one aspect, the present invention relates to a flame-retarded styrene-containing polymer composition, which composition comprises a styrene-containing polymer, 0.5-1.7 wt % antimony trioxide, tris(2,4,6-tribromophenoxy)-s-triazine and an anti-dripping agent, such that the bromine content of the composition provided by said tris(2,4,6-tribromophenoxy)-s-triazine (designated Bromine$_{(FR-245)}$) is in the range between 8 and 18 wt %, and when the styrene-containing polymer includes high impact polystyrene (HIPS), then said Bromine$_{(FR-245)}$ is related to the weight concentration of said antimony trioxide (designated [Sb$_2$O$_3$]) by the following inequalities:

$$\text{Bromine}_{(FR-245)} \geq -4 \times [\text{Sb}_2\text{O}_3] + 15, \text{ for } 1.0 \leq [\text{Sb}_2\text{O}_3] \leq 1.7 \quad (i)$$

$$\text{Bromine}_{(FR-245)} \geq -10 \times [\text{Sb}_2\text{O}_3] + 21, \text{ for } 0.5 \leq [\text{Sb}_2\text{O}_3] < 1.0 \quad (ii)$$

The preferred compositions of the invention having the characteristics set forth above meet at least the UL 94 V-1 rating. More preferred are compositions which contain between 0.8 and 1.5 wt % antimony trioxide, and more specifically, between 1.0 and 1.5 wt % antimony trioxide.

The composition that is flame-retarded according to the present invention preferably comprises one or more styrene-containing polymers at a concentration of not less than 30 wt %, more preferably not less than 40 wt %, and even more preferably above 50% wt, e.g., between 50-87%. According to some embodiments of the invention, the composition comprises between 70 to 87 wt % styrene-containing polymers. The latter term, as used herein, refers to polymers, and specifically copolymers (including terpolymers), which contain (optionally substituted) styrenic structural unit, however combined with one or more other structural units. Preferred are styrene-based copolymers belonging to the following classes:

1) HIPS, the rubber-modified copolymers of styrenic monomers, obtainable, for example, by mixing an elastomer (butadiene) with the (optionally substituted) styrenic monomer(s) prior to polymerization. Characteristics and compositions of HIPS are described, for example, in "Encyclopedia of Polymer Science and Engineering", Volume 16, pages 88-96 (1985). The HIPS compositions provided by the invention generally comprise between 40% and 85%, more preferably between 50 and 85% HIPS resins having a melt flow index (MFI) between 1 and 50 g/10 min (ISO 1133; 200° C./5 kg).

2) ABS, which term refers in the context of the present invention to copolymers and terpolymers that include the structural units corresponding to (optionally substituted) styrene, acrylonitrile and butadiene, regardless of the composition and method of production of said polymers. Characteristics and compositions of ABS are described, for example, in Encyclopedia of Polymer Science and Engineering, Volume 16, pages 72-74 (1985). ABS compositions of the invention may contain between 40 and 85 wt %, more specifically between 50 and 83% ABS with MFI between 1 and 50 g/10 min (measured according to ISO 1133 at 220° C./10 kg).

3) SAN, the copolymer of acrylonitrile and styrene, and SMA, the copolymer of styrene with maleic anhydride. Characteristics of SAN and SMA are described in "Encyclopedia of Polymer Science and Engineering", Volume 16, pages 72-73 (1985). SAN compositions of the invention preferably comprise between 40 and 85% SAN, and SMA compositions of the invention preferably contain between 40 and 85% SMA.

It is noted that the flame-retarded composition of the invention may contain an alloy of a styrene-containing polymer, namely, a blend of styrene-containing polymer as set forth above with a second polymer or copolymer (such blends are obtained by extruding pellets of the styrene-containing polymer and pellets of the second polymer in desired proportions). Preferred examples include a blend of HIPS and polyphenylene oxide and a blend of ABS with polycarbonate. For an ABS/polycarbonate alloy, the composition of the invention may contain the styrene-containing polymer (ABS) at a concentration in the range between 5 and 85%.

HIPS compositions meeting the UL 94 V-1 rating and having antimony trioxide confined within the range between 1.0 and 1.5 wt % are of particular interest. The present invention provides such compositions, in which the amount of tris(2,4,6-tribromophenoxy)-s-triazine is adjusted such that the bromine content of the composition is preferably less than 13 wt %, more preferably less than 12 wt %, and especially between 9 and 11 wt %, wherein said bromine content follows the first inequality presented above:

$$\text{Bromine}_{(FR-245)} \geq -4 \times [Sb_2O_3] + 15, \text{ for } 1.0 \leq [Sb_2O_3] \leq 1.5 \quad \text{(i)}$$

When ABS compositions meeting the UL 94 V-1 rating and having antimony trioxide confined within the range between 1.0 and 1.5 are sought, then the amount of tris(2,4,6-tribromophenoxy)-s-triazine is adjusted such that the bromine content of the composition provided by said flame retardant is preferably in the range between 15 and 9 wt %, more preferably between 14 and 11 wt % and even more preferably between 13 and 11 wt %. When formulations of ABS-containing alloys (such as ABS/polycarbonate) are to be prepared, then the amount of tris(2,4,6-tribromophenoxy)-s-triazine is adjusted taking into account the ratio between the ABS and the polycarbonate.

The invention also provides compositions which pass the UL 94 V-0 test. It has been found that the amount of $\text{Bromine}_{(FR-245)}$ required for securing UL 94 V-0 rating for HIPS compositions which contain only 0.5 and 1.7 wt % antimony trioxide is surprisingly low: between 11 and 17 wt %. For 0.5-1.5 wt % antimony trioxide, the amount of $\text{Bromine}_{(FR-245)}$ in the HIPS composition is within the range between 13 and 17 wt %. The amount of $\text{Bromine}_{(FR-245)}$ suitable for obtaining UL 94 rated compositions may be matched nicely to the antimony trioxide content of the HIPS composition over the entire $Sb_2O_3$ concentration range according to the following inequality:

$$\text{Bromine}_{(FR-245)} \geq -4.5 \times [Sb_2O_3] + 19.5, \text{ for } 0.5 \leq [Sb_2O_3] \leq 1.7 \quad \text{(iii)}$$

When ABS compositions meeting UL 94 V-0 rating are contemplated, then said compositions may be made by combining 0.5-1.5 wt % antimony trioxide with tris(2,4,6-tribromophenoxy)-s-triazine in an amount sufficient for providing $\text{Bromine}_{(FR-245)}$ between 18 and 10 wt %, and preferably between 16 and 11 wt %.

In order for a material to attain the self-extinguishing UL 94 V-1 and V-0 ratings, the material is required to have a short combustion time and not to ignite cotton placed below the material due to dripping caused at the time of combustion. The compositions according to the present invention also include one or more anti-dripping agents such as polytetrafluoroethylene (abbreviated PTFE) in a preferred amount between 0.025 and 0.4 wt %, more preferably between 0.025 and 0.3 wt %, and even more preferably between 0.05 and 0.2 wt %. PTFE is described, for example, in U.S. Pat. No. 6,503,988.

In addition to the styrene-containing copolymer, tris(2,4,6-tribromophenoxy)-s-triazine, antimony trioxide and the anti-dripping agent (and optionally also other brominated flame retarding agents as discussed in more detail), the composition of this invention may further contain conventional ingredients, such as impact modifiers, pigments, UV stabilizers, heat stabilizers, fillers, lubricants and antioxidants (e.g., of hindered phenol type). The concentration of each of the additives listed above is typically in the range between 0.025 and 15 wt %.

The compositions of the invention may be prepared as follows. The various ingredients of the composition are blended together according to their respective amounts. Generally, the ingredients are first dry blended using suitable mixing machines, such as Henschel mixer, or may be dosed directly to the extruder. The powder mixture may then be processed and compounded to form homogeneous pellets, for example, by using a twin-screw extruder. The pellets obtained are dried, and are suitable for feed to an article shaping process such as injection or extrusion molding. Other blending and shaping techniques can also be applied. Process parameters are described in more detail in the examples that follow.

Another aspect of the invention relates to the incorporation of the flame retardant tris(2,4,6-tribromophenoxy)-s-triazine into the formulation via a masterbatch (which may optionally contain the antimony trioxide). It has been found that tris(2,4,6-tribromophenoxy)-s-triazine can also be incorporated in a "masterbatch" form, which is a composition comprising a suitable polymer carrier, and a relatively high proportion of the tris(2,4,6-tribromophenoxy)-s-triazine. The carrier polymer is intended to facilitate mixing of the masterbatch and improve the compatibility of the masterbatch and the blend polymer (the blend polymer is the polymer combined with the masterbatch; in the present case, the blend polymer is a styrene-containing polymer, such as HIPS or ABS). Suitable carrier polymers are similar or identical with the blend polymer. Otherwise a carrier which is compatible with the blend polymer is used.

The invention therefore relates to a process for preparing a composition as set forth above, which process comprises providing a masterbatch containing tris(2,4,6-tribromophenoxy)-s-triazine and optionally antimony trioxide, and processing said masterbatch with the styrene-containing polymer, the anti-dripping agent and also antimony trioxide if the latter is not present in said masterbatch, such that the concentration of the antimony trioxide within the resultant composition is in the range between 0.5 and 1.7 wt %.

The invention also provides a masterbatch composition, in which tris(2,4,6-tribromophenoxy)-s-triazine and antimony trioxide are combined together within a carrier polymer, with their respective amounts being appropriately proportioned in order to afford the desired concentrations ranges in the final composition. More specifically, the masterbatch is suitable for the preparation of formulations of styrene-containing polymers having antimony trioxide content in the range between 0.5 and 1.7 wt %. Accordingly, the present invention also relates to a masterbatch composition comprising:

(i) not less than 50 wt % of tris(2,4,6-tribromophenoxy)-s-triazine, optionally together with other flame retardants;
(ii) antimony trioxide; and
(iii) a polymer carrier;
characterized in that the ratio between the total bromine content of said masterbatch and antimony trioxide is not less than 5, and preferably not less than 7, and more specifically between 7 and 40.

A suitable polymer carrier may be styrene or acrylate containing homo or copolymer (for example, polystyrene). The concentration of the flame retardant in the masterbatch may be between 50 and 90 wt %, and the concentration of the carrier is between 5 and 42 wt %. The concentration of the antimony trioxide in the masterbatch is such that upon blending the masterbatch with the plastic matrix, to form the styrene-containing polymeric composition of the invention, then the concentration of the antimony trioxide in the final composition is adjusted within the limits set forth above.

The concentration of the antimony trioxide in the masterbatch of the invention is therefore preferably between 1 and 7 wt %, more preferably between 2 and 6 wt %. The masterbatch may optionally contain approximately 0.2 to 4% PTFE.

The masterbatch may be prepared by methods known in the art, such as those described in EP 527493. The carrier, tris(2, 4,6-tribromophenoxy)-s-triazine and antimony trioxide (and optional additives) are processed (i.e., in an extruder) to form a homogeneous blend. Processing temperatures may be similar to those indicated for the fully formulated composition, as detailed in the experimental section below.

The masterbatch composition of the invention may be provided in the form of essentially homogeneous pellets. The masterbatch obtained is combined with suitable amounts of the blend polymer (HIPS, ABS) as defined above and remaining components (the masterbatch is preferably added to the polymer blend at a concentration of about 10 to 50 wt %). The resulting blend is extruded, pelletized and dried, to form the desired UL 94 V-1 or V-0 styrene-containing polymeric compositions of the invention, which can be shaped (e.g., molded) as described above.

Another aspect of the invention relates to a method for reducing, and even completely preventing, the dripping of styrene-containing polymer formulation at the time of combustion. Antimony trioxide, due to its very high melting point at 656° C., is known to have a favorable effect in reducing the dripping of plastic materials at the time of combustion. Furthermore, as also noted above, the melting point of tris(2,4, 6-tribromophenoxy)-s-triazine is significantly lower than the melting points of other useful brominated flame retardants (decabromodiphenyl ethane or decabromodiphenyl oxide). Against this background, it was surprising to find that styrene-containing polymer formulations which comprise tris(2, 4,6-tribromophenoxy)-s-triazine in combination with less than 2 wt %, and preferably less than 1.7 wt % (between 0.5 and 1.5 wt %) antimony trioxide, do not substantially drip at the time of combustion. Accordingly, the present invention further provides a method for reducing, and even completely preventing, the dripping of styrene-containing polymer formulation at the time of combustion, wherein said formulation contains less than 2 wt %, and preferably less than 1.7 wt % antimony trioxide, which method comprises adding an effective flame retarding amount of tris(2,4,6-tribromophenoxy)-s-triazine into said formulation together with at least one anti-dripping agent (e.g., PTFE).

The preferred compositions provided by the present invention comprise tris(2,4,6-tribromophenoxy)-s-triazine as the sole brominated flame retardant. More specifically, when the concentration of antimony trioxide in the composition ranges between 1.0 to 1.5 wt %, then tris(2,4,6-tribromophenoxy)-s-triazine may be incorporated as the sole brominated flame retardant within the composition to achieve UL 94 V-1 or V-0 ratings, with the ratio Bromine$_{(FR-245)}$:[Sb$_2$O$_3$] being adjusted within the range of 15:1 to 6:1, respectively (the ratio is inversely related to the concentration of the synergist). As noted above, in the case of HIPS compositions, the adjustment may be carried out according to the linear functional dependence observed.

It should be understood, however, that the compositions of the present invention may contain, in addition to tris(2,4,6-tribromophenoxy)-s-triazine, other flame retarding agents, including brominated flame retarding agents. Indeed, formulations of styrene-containing polymers which are flame retarded with a brominated flame retardant in combination with antimony trioxide may benefit (at least additively and even synergistically) from the incorporation of tris(2,4,6-tribromophenoxy)-s-triazine within the formulation, since the amount of antimony trioxide may be adjusted in such compositions to a level which has been considered impractical. The present invention therefore provides a flame-retarded styrene-containing polymer composition, which composition comprises a styrene-containing polymer, 0.5-1.7 wt % of antimony trioxide (preferably 0.5-1.5%, more preferably 1.0-1.5% antimony trioxide), an anti-dripping agent, tris(2,4,6-tribromophenoxy)-s-triazine and at least one additional brominated flame retarding agent, wherein the total bromine content of the composition is in the range between 11 and 18 wt %, with said tris(2,4,6-tribromophenoxy)-s-triazine preferably providing between, 40-90 wt % of said total bromine content.

More specifically, tris(2,4,6-tribromophenoxy)-s-triazine may be coupled with a brominated flame-retarding agent having the formula II:

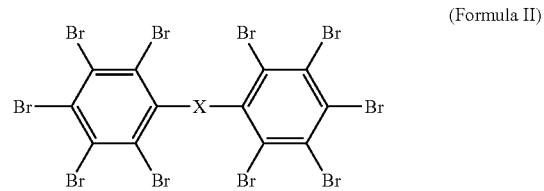

(Formula II)

wherein X is —O— or —CH$_2$—CH$_2$— (for decabromodiphenyl oxide and decabromodiphenyl ethane, respectively) in styrene-containing polymers which contain no more than 1.5 wt % antimony trioxide to form formulations which are UL 94 V-1 or V-0 rated. The incorporation of FR-245 into HIPS formulations which are flame-retarded by decabromodiphenyl oxide or decabromodiphenyl ethane allows the reduction of the content of antimony trioxide to below 1.5 wt % while keeping the total bromine level in the formulation within an acceptable range.

Both decabromodiphenyl oxide and decabromodiphenyl ethane are recommended for use in HIPS formulation. However, it is well accepted in the art that their activity as fire retarding agents for HIPS needs to be supported by the presence of not less than 2% by weight of antimony trioxide, in order to allow the HIPS composition to meet either UL 94 V-1 or V-0 rating. As illustrated in the examples which follow, it is possible to reduce the amount of the antimony trioxide in such HIPS formulations which are flame retarded by either FR 1210 or S-8010 or their blends to below 2.0 wt % and even to below 1.5% by weight (preferably adjusting the Sb$_2$O$_3$ concentration in the range between 0.5 and 1.5 wt %), by incorporating FR-245 in said HIPS compositions, such that a portion (e.g., not less than a third) of the total amount of bromine provided by the combination of brominated flame retarding agents present in the composition (FR 245+FR 1210 and/or FR-245+S-8010) originates from FR 245.

Accordingly, the present invention provides a flame-retarded styrene-containing polymer composition, which composition comprises a styrene-containing polymer, less than 2 wt % antimony trioxide (more preferably 0.5-1.7 wt % Sb$_2$O$_3$, and even more preferably 1.0-1.5 wt % Sb$_2$O$_3$), tris (2,4,6-tribromophenoxy)-s-triazine and a second brominated flame retardant selected from the group consisting of decabromodiphenyl oxide, decabromodiphenyl ethane and mixtures thereof, wherein the total bromine content of the composition is in the range between 8 and 18 wt %, and more preferably between 11 and 18 wt % and most preferably between 13 and 18 wt %.

When tris(2,4,6-tribromophenoxy)-s-triazine is included in the composition of the invention together with at least a second brominated flame retardant as set forth above, then it is generally preferred to use tris(2,4,6-tribromophenoxy)-s-triazine as the "major" brominated flame retardant, such that the amount of bromine that is generated by tris(2,4,6-tribromophenoxy)-s-triazine is at least 50%, and preferably at least 70%, of the total weight of the bromine provided by all the flame retardants present in the composition. Blends of tris(2,4,6-tribromophenoxy)-s-triazine with either decabromodiphenyl oxide or decabromodiphenyl ethane, with the ratios Bromine$_{(FR\ 245)}$:Bromine$_{(FR-1210)}$ or Bromine$_{(FR\ 245)}$:Bromine being in the range between 1:1 and 4:1, preferably between 1:1 and 3:1, have been found useful for retarding the flammability of HIPS compositions which contain less than 2% by weight of antimony trioxide (e.g., between 0.5 and 1.7 wt %, preferably between 0.5 and 1.5 wt % $Sb_2O_3$ and more preferably between 1.0 and 1.5 wt % $Sb_2O_3$).

Another class of flame retardants which may be advantageously coupled with tris(2,4,6-tribromophenoxy)-s-triazine in styrene-containing polymers having low antimony content in the range between 0.5 and 1.7 wt %, specifically in the range between 1.0 and 1.5 wt %, include compounds obtainable by reacting tetrabromobisphenol A (chemically named 4,4'-isopropylidene-bis(2,6-dibromophenol) with epichlorohydrin (chemically named chloromethyl oxirane). The reaction of tetrabromobisphenol A with epichlorohydrin is known to yield various reactive epoxies having high bromine content, which may be used as such, or in the form of their end-capped derivatives. As individual compounds, the aforementioned brominated epoxy oligomers and their tribromophenol end-capped derivatives can be represented by formula (III):

between 0 and 5, and $R_1$ and $R_2$ are independently selected from the group consisting of the following monovalent radicals:

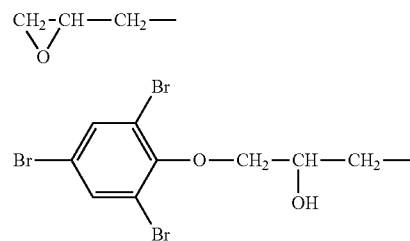

The tribromophenol end-capped brominated epoxy derivatives are provided in the form of various mixtures comprising the individual derivatives represented by Formula (IIIa):

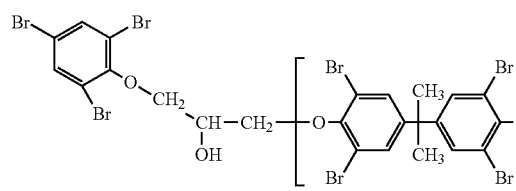

(Formula IIIa)

wherein n equals 0, 1, 2, 3, and 4.

The aforementioned tribromophenol end-capped brominated epoxy of Formula IIIa may be provided in the form of a mixture which is essentially composed as follows (the composition of the mixture may be determined by GPC; the ranges are given in terms of weight percent of the individual compound relative to the total weight of the mixture):

The monomer (n=0): 55-70%, and preferably about 65-70%;
the dimer (n=1): 20-35%, and preferably about 25-30%;
the trimer and higher order oligomers (n≧2): 5-15%, and preferably about 5-10%.

The aforementioned end-capped derivatives of Formula IIIa may be also provided in the form of a mixture comprising:

The monomer (n=0): 30-50%, and preferably about 35-45%;
the dimer (n=1): 5-15%, and preferably about 7-13%;
the trimer (n=2): 5-20%, and preferably about 10-15%.
Higher order oligomers (n>2): 20-40%, and preferably 25-35%;

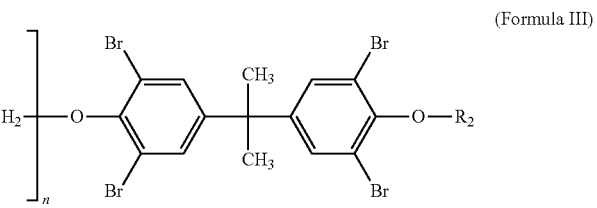

(Formula III)

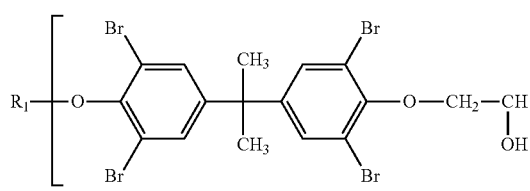

wherein n, the degree of polymerization, is an integer in the range between 0 and 100, and more preferably in the range and less than 10% of a compound of Formula (III) wherein the end units $R_1$ and $R_2$ are different.

The mixtures of the end-capped derivatives of Formula IIIa can be prepared by methods known in the art and are also commercially available (e.g., F-3014 and F-3020 manufactured by ICL-IP, which correspond to the first and second mixtures with the compositions identified above, respectively).

Also included within the scope of the flame retarding agent of Formula III are epoxy resins represented by the following Formula (IIIb):

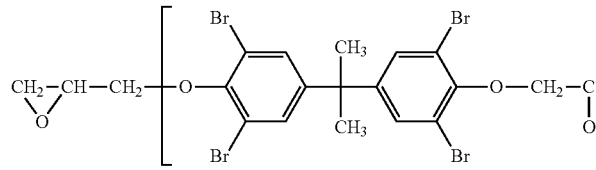 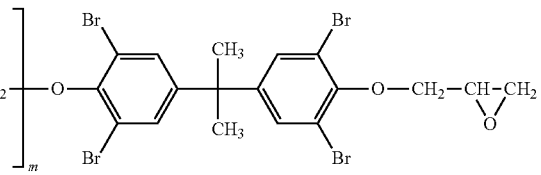

(Formula IIIb)

wherein m, the weight-average degree of polymerization, is in the range between 0 and 100. More specifically, the epoxy-terminated flame retarding agent represented by Formula (IIIb) useful according to the invention has an average epoxy equivalent weight in the range between 400 and 3000 g/eq. The epoxy equivalent weight (EEW) is defined as the molecular weight of the substance divided by the number of epoxy groups contained therein, and may be measured by methods known in the art (e.g., "Encyclopedia of polymer science and engineering" John Wiley & Sons, Vol. 6 (1986)). The brominated epoxy oligomer which is commercially available under the name F 2016 from ICL-IP, with a molecular weight of 1600 g/mol belongs to the class of flame retarding agents represented by Formula IIIb, which may be used according to the invention.

The inventors acquired experimental data showing that in styrene-containing polymers with an antimony trioxide loading in the range between 1.0 and 1.5 wt % (and PTFE of about 0.025-0.2 wt %), the combination of tris(2,4,6-tribromophenoxy)-s-triazine and a flame retarding agent of formula III (which may be either a mixture of the end-capped derivatives of Formula IIIa, such as F 3014, or a mixture of tetrabromobisphenol A diglycidyl ether derivatives of Formula IIIb, such as F 2016) displays surprisingly strong flame retarding properties. The combination of tris(2,4,6-tribromophenoxy)-s-triazine and a flame retarding agent of Formula III appears sometimes to perform even better than each of the individual components alone, allowing the HIPS composition to reach UL 94 V-0 rating when the total bromine content of the composition is 13 wt %, for antimony trioxide loading of 1 wt %. For the purpose of comparison it is noted that when either FR 245 or F 3014 is used alone in HIPS composition having 1 wt % antimony trioxide, then the bromine content that should be supplied for securing UL 94 V-0 rating is at least 15 wt %.

The results illustrated in the Examples below for the compositions of the invention having antimony trioxide content in the range between 0.5 and 1.7 wt % (preferably 1-1.5%), indicate that the effect of combining tris(2,4,6-tribromophenoxy)-s-triazine and a flame retarding agent of formula III, and specifically, of Formula IIIa (such as F 3014) or Formula IIIb (such as F 2016), is more than additive, when the ratio between the two components is in the range between 1:1 and 4:1, preferably between 1:1 and 3:1, calculated with respect to the amount of bromine delivered by each individual flame retarding agent within the composition. Accordingly, for the combination of FR 245 and a flame retardant of Formula IIIa, the ratio bromine$_{(FR\ 245)}$:bromine$_{(Formula\ IIIa)}$ is in the range between 1:1 and 4:1, preferably between 1:1 and 3:1. Similarly, for the combination of FR 245 and a flame retardant of Formula IIIb, the ratio bromine$_{(FR\ 245)}$:bromine$_{(Formula\ IIIb)}$ in the range between 1:1 and 4:1, preferably between 1:1 and 3:1.

The styrene-containing polymer compositions of the invention comprise a very low amount of antimony trioxide, an anti-dripping agent and tris(2,4,6-tribromophenoxy)-s-triazine, optionally together with one or more additional brominated flame retardants. Preferably, the composition contains no more than two brominated flame-retardants (namely, tris(2,4,6-tribromophenoxy)-s-triazine and a second brominated flame retardant such as those specifically identified above). A thermoplastic article formed from the composition of the invention as set forth above (for example, an injection molded article) forms another aspect of the present invention.

EXAMPLES

Materials

In the following examples, a flame retardant is sometimes abbreviated FR. The various materials used for preparing the compositions illustrated in the examples are described in Table A:

TABLE A

| TRADE NAME (PRODUCER) | GENERAL DESCRIPTION | FUNCTION |
|---|---|---|
| HIPS Styron 1200A-Tech (Dow) | High impact polystyrene | plastic matrix |
| HIPS Styron 485 (Dow) | High impact polystyrene (easy-flowing- MFI = 12 g/10 min | plastic matrix |
| ABS Magnum 3404 and 342EZ(Dow) | Acrylonitrile butadiene styrene terpolymer, general grade | plastic matrix |
| PC Makrolon 1134 (Bayer) | Polycarbonate (MFI = 3 g/10 min) | Plastic matrix |
| A0 112 (Kafrit) | Antimony trioxide master batch which contains 80 wt % Sb2O3 | FR - synergist |
| FR-1210 (ICL-IP) | Decabromodiphenyl oxide | FR |
| S-8010 (Albermarle) | Decabromodiphenyl ethane | FR |
| FR-245 (ICL-IP) | tris(2,4,6-tribromophenoxy)-s-triazine | FR |
| F 3014 | Tribromophenol end-capped brominated epoxy | FR |
| F 2016 | Brominated epoxy oligomer | FR |
| PTFE Hostaflon 2071 (Dynon) | PTFE fine powder (500 μm) | Anti-dripping agent |

It should be noted that the antimony trioxide was used in a form of a commercially available masterbatch. In the examples, the (pure) antimony trioxide content in the composition is indicated, sometimes alongside the amount of the commercially available masterbatch actually used as the source for the Sb$_2$O$_3$.

Procedures for Preparing and Testing HIPS and ABS Formulations

All the components were weighted on Sartorius semi-analytical scales followed by manual mixing in plastic bags. The mixtures were fed via polymer feeder of K-SFS 24 gravimetric feeding system ex. K-Tron to the main feeding port of the extruder.

Compounding was performed in a twin-screw co-rotating extruder ZE25 with L/D=32 ex Berstorff. The compounding conditions are:

Temperature profile ('C):
130-160-200-210-210-210-220-220-220,
Screw speed of 300 rpm,
Feeding rate of 14 kg/h.

The extruded strands were pelletized in pelletizer 750/3 ex Accrapak systems limited.

The obtained pellets were dried in a circulating air oven ex Heraeus instruments at 75° C. for 4 hours.

After drying, the pellets obtained were injection molded to form test specimens. Test specimens were prepared by injection molding in Allrounder 500-150 ex. Arburg. The injection molding conditions are:

HIPS Formulations

| Temperature profile, ° C.: | 180-230-230-230-230 |
|---|---|
| Mold temperature, ° C.: | 40 |
| Pressures, Bar: | |
| Injection | 1300 |
| Holding | 750 |
| Back | 20 |
| Cycle time, sec | 15 |

ABS Formulations

| Temperature profile, ° C.: | 180-200-230-230-230 |
|---|---|
| Mold temperature, ° C.: | 40 |
| Pressures, Bar: | |
| Injection | 500 |
| Holding | 250 |
| Back | 20 |
| Cycle time, sec | 15 |

The following properties of the samples were measured:

Flame-retardancy properties of the molded samples were measured using Underwriters-Laboratories standard UL 94, on thickness of 1.6 mm. In the UL 94 test, a specimen is exposed vertically to a flame for 10 seconds. The specimen is ignited at the bottom and burns up. If the specimen self-extinguishes within 30 seconds, another 10 seconds application is made. Flaming droplets are allowed to fall on cotton located below the sample. If the average burning time is less than 5 seconds (per application of flame) and the droplets do not ignite the cotton, the material is classified as UL 94 V-0. If the average of burning time is less than 25 seconds and the droplets do not ignite the cotton, the material is classified as UL 94 V-1. If the average burning time is less than 25 seconds but the droplets ignite the cotton, the material is classified as UL 94 V-2.

Examples 1 (of the Invention) and 2-3 (Comparative)

HIPS Compositions which are Flame Retarded with FR 245 in the Presence of Low Amount of Antimony Trioxide (1.0 Wt %)

Three flame retardants agents: Tris(2,4,6-tribromophenoxy)-s-triazine, decabromodiphenyl oxide and decabromodiphenyl ethane were incorporated into HIPS compositions according to the general procedures described above, in order to evaluate their cooperation with antimony trioxide when the latter is present at a weight concentration of 1.0%. The compositions prepared and the properties measured are summarized in Table 1 below.

TABLE 1

| | Example | | | | | |
|---|---|---|---|---|---|---|
| | Example 1 | | Example 2 | | Example 3 | |
| | | | FR type | | | |
| Composition, wt % | FR-245 | | FR-1210 | | S-8010 | |
| HIPS Styron 1200 | 82.2 | 76.2 | 76.9 | 75.7 | 76.6 | 75.4 |
| FR | 16.4 | 22.4 | 21.7 | 22.9 | 22 | 23.2 |
| Antimony trioxide (AO 112) | 1 (1.3) | 1 (1.3) | 1 (1.3) | | | |
| PTFE | 0.1 | | 0.1 | | 0.1 | |
| Bromine content, % | 11 | 15 | 18 | 19 | 18 | 19 |
| Flame retardancy UL 94: (thickness 1.6 mm) | | | | | | |
| Class | V-1 | V-0 | V-2 | V-0 | HB | V-0 |
| Maximum flaming time, sec | 26 | 3 | 20 | 2 | 39 | 6 |
| Total flaming time, sec | 105 | 16 | 60 | 9 | 97 | 14 |
| Number of specimens dripping | 0 | 0 | 2 | 0 | 2 | 0 |
| Number of specimens igniting cotton | 0 | 0 | 2 | 0 | 2 | 0 |

It may be seen from the results reported in Table 1 that when the antimony trioxide synergist is included in the HIPS composition in a low amount of 1.0 wt %, then it still cooperates effectively with FR-245. Only a relatively low concentration of bromine is needed from FR-245 in order for the composition to reach the UL 94 V-1 and V-0 ratings. Specifically, if FR-245 is used in combination with 1% antimony trioxide, then an amount of 11 wt % bromine in the HIPS composition is sufficient for passing the UL 94 V-1 test. In contrast, when the normally powerful flame retardants FR-1210 and decabromodiphenyl ethane serve as the bromine sources, then even an amount of 18 wt % bromine contributed by said materials in the HIPS composition is not sufficient for reaching the UL 94 V-1 rating. A similar behavior is observed also when UL 94 V-0 class is targeted.

It is also noted that despite its relatively low melting point as compared to the other two flame retarding agents, FR-245 does not cause igniting drips while the compositions that are flame retarded with the high-melting materials decabromodiphenyl oxide or decabromodiphenyl ethane drip while burning.

Examples 4 (of the Invention) and 5-6 (Comparative)

HIPS Compositions which are Flame Retarded with FR 245 in the Presence of Low Amount of Antimony Trioxide (1.5 Wt %)

The three flame retardants identified in the previous examples were incorporated into HIPS compositions according to the general procedures described above, in order to evaluate their efficacy in the presence of 1.5 wt % antimony trioxide synergist. The compositions prepared and the properties measured are summarized in Table 2 below.

TABLE 2

|  | Example | | | | | |
|---|---|---|---|---|---|---|
|  | Example 4 | | Example 5 FR type | | Example 6 | |
| Composition, wt % | FR-245 | | FR-1210 | | S-8010 | |
| HIPS Styron 1200 | 84.6 | 78.6 | 81.1 | 79.9 | 80.9 | 79.7 |
| FR | 13.4 | 19.4 | 16.9 | 18.1 | 17.1 | 18.3 |
| Antimony trioxide (AO 112) | 1.5 (1.9) | | 1.5 (1.9) | | 1.5 (1.9) | |
| PTFE | 0.1 | | 0.1 | | 0.1 | |
| Bromine content, % | 9 | 13 | 14 | 15 | 14 | 15 |
| Flame retardancy UL 94: (thickness 1.6 mm) | | | | | | |
| Class | V-1 | V-0 | V-2 | V-0 | HB | V-0 |
| Maximum flaming time, sec | 27 | 4 | 28 | 6 | 65 | 5 |
| Total flaming time, sec | 141 | 21 | 48 | 22 | 130 | 16 |
| Number of specimens dripping | 0 | 0 | 1 | 0 | 3 | 0 |
| Number of specimens igniting cotton | 0 | 0 | 1 | 0 | 3 | 0 |

The results shown in Table 2 are essentially consistent with those reported in the previous set of examples, demonstrating again that when antimony trioxide is used in the HIPS composition in a low amount (1.5 wt %), then it best cooperates with FR-245, as compared to FR-1210 and decabromodiphenyl ethane. Specifically, the pair FR-245/antimony trioxide brings the composition to UL 94 V-1 and V-0 ratings with the bromine content being kept especially low (9 wt % and 13 wt %, respectively). For FR-1210 and decabromodiphenyl ethane, a concentration greater than 14 wt % bromine is needed in the HIPS resin in order to pass the UL 94 V-1 rating.

Again it is noted that the relatively low melting FR-245 does not cause any dripping while the HIPS formulations that contain the higher melting flame retarding agents drip and ignite the cotton which is a sign of weaker fire retardant efficiency.

Examples 7 (of the Invention) and 8-9 (Comparative)

HIPS Compositions which are Flame Retarded with FR 245 in the Presence of Low Amount of Antimony Trioxide (0.5 Wt %)

The three flame retardants identified in the previous examples were incorporated into HIPS compositions according to the general procedures described above, in order to evaluate their efficacy in the presence of 0.5 wt % antimony trioxide synergist. The compositions prepared and the properties measured are summarized in Table 3 below.

TABLE 3

|  | Example | | | | | |
|---|---|---|---|---|---|---|
|  | Example 7 | | Example 8 FR type | | Example 9 | |
| Composition, wt % | FR-245 | | FR-1210 | | S-8010 | |
| HIPS Styron 1200 | 75.4 | 73.9 | 76.4 | 75.2 | 76.1 | 74.9 |
| FR | 23.9 | 25.4 | 22.9 | 24.1 | 23.2 | 24.4 |
| Antimony trioxide (AO 112) | 0.5 (0.6) | | 0.5 (0.6) | | 0.5 (0.6) | |
| PTFE | 0.1 | | 0.1 | | 0.1 | |
| Bromine content, % | 16 | 17 | 19 | 20 | 19 | 20 |
| Flame retardancy UL 94: (thickness 1.6 mm) | | | | | | |
| Class | V-1 | V-0 | V-2 | V-2 | V-2 | V-2 |
| Maximum flaming time, sec | 30 | 6 | 24 | 18 | 12 | 9 |
| Total flaming time, sec | 105 | 24 | 80 | 68 | 52 | 30 |
| Total afterglow time | 0 | 0 | 0 | 0 | 0 | 0 |
| Number of specimens dripping | 0 | 0 | 4 | 4 | 4 | 3 |
| Number of specimens igniting cotton | 0 | 0 | 4 | 4 | 4 | 3 |
| Number of specimens burned up to the clamp | 0 | 0 | 0 | 0 | 0 | 0 |

Again, the results confirm that FR-245 performs better than decabromodiphenyl oxide and decabromodiphenyl ethane when antimony trioxide is present in the HIPS composition at a concentration of 0.5 wt %.

Examples 10-11

HIPS Compositions which are Flame Retarded with FR 245 in the Presence of Low Amount of Antimony Trioxide (0.75 or 1.25 Wt %)

The efficacy of the combination of FR 245 and antimony trioxide, when the latter is present in the HIPS composition at a concentration in the range between 0.5 and 1.5 wt % was further tested with respect to two more concentration points within said range: 0.75 wt % and 1.25 wt %. The results are reported in Table 4.

TABLE 4

|  | Example | | | |
|---|---|---|---|---|
|  | Example 10 | | Example 11 | |
| Composition, wt % | | | | |
| HIPS Styron 1200 | 75.1 | 73.6 | 80.4 | 78.9 |
| FR 245 | 23.9 | 25.4 | 17.9 | 19.4 |
| Antimony trioxide (AO 112) | 0.75 (0.9) | | 1.25 (1.6) | |
| PTFE | 0.1 | | 0.1 | |
| Bromine content, % | 15 | 16 | 12 | 13 |
| Flame retardancy UL 94: (thickness 1.6 mm) | | | | |
| Class | V-1 | V-0 | V-1 | V-0 |
| Maximum flaming time, sec | 19 | 8 | 22 | 9 |
| Total flaming time, sec | 54 | 21 | 71 | 44 |
| Total after glow time | 0 | 0 | 6 | 0 |
| Number of specimens dripping | 0 | 0 | 0 | 0 |
| Number of specimens igniting cotton | 0 | 0 | 0 | 0 |
| Number of specimens burned up to the clamp | 0 | 0 | 0 | 0 |

The amount of bromine that needs to be provided by FR-245 in order to allow the HIPS composition to pass either the UL 94 V-1 or V-0 tests, when said flame retardant is supported by only a small amount of antimony trioxide (in the concentration range between 0.5 and 1.5 wt %) is graphically presented in FIG. 1. The set of points which are shown in the graph were taken from Examples 1, 4, 7, 10 and 11.

In FIG. 1, the abscissa is the concentration of antimony trioxide in the HIPS composition and the ordinate is the bromine content of the composition provided by FR 245 $\{Bromine_{(FR-245)}\}$. The set of points indicated by solid rhombuses stands for compositions meeting the UL 94 V-1 rating. The set of points indicated by solid squares represents compositions meeting the UL 94 V-0 rating.

As shown in the graph, the UL 94 V-0 set of points fits nicely to a straight line, and therefore the area above that straight line, which is represented by following inequality:

$$Bromine_{(FR-245)} \geq -4.5 \times [Sb_2O_3] + 19.5, \text{ for } 0.5 \leq [Sb_2O_3] \leq 1.5$$

corresponds to HIPS compositions which comprise antimony trioxide at a concentration ranging between 0.5 and 1.5 wt % and a suitable amount of bromine supplied by FR-245 sufficient for satisfying the stringent UL 94 V-0 test. Notably, for the sub-range between 0.5 and 1.0 wt % antimony trioxide, the necessary amount of $Bromine_{(FR-245)}$ can be less than 15 wt %.

For compositions qualifying as UL 94 V-1, the 0.5-1.5 wt % interval may be conveniently divided into two sub-intervals: between 0.5-1.0 wt % and 1.0-1.5 wt %. The amount of $Bromine_{(FR-245)}$ required for acquiring UL V-1 rating in each of these sub-ranges may be described as follows:

$$-4 \times [Sb_2O_3] + 15 \leq Bromine_{(FR-245)} \leq 13 \{1.0 \leq [Sb_2O_3] \leq 1.5\}$$

$$-10 \times [Sb_2O_3] + 21 \leq Bromine_{(FR-245)} \leq 16 \{0.5 \leq [Sb_2O_3] < 1.0\}$$

The interval of $1.0 \leq [Sb_2O_3] \leq 1.5$ is especially useful, since for this interval, the amount of $Bromine_{(FR-245)}$ required for reaching the UL 94 V-1 rating is surprisingly small, and may be not more 13 wt %, preferably not more than 12 wt % and even more preferably not more 11 wt %.

Examples 12-13

Incorporating FR-245 in HIPS Composition Using a Masterbatch

FR 245 was used in the form of a masterbatch having a concentration of 90 wt % (the carrier was polystyrene). The masterbatch was prepared by extruding the components.

The HIPS compositions were prepared as follows. All the components were weighted on Sartorius semi-analytical scales followed by manual mixing in plastic bags. The mixtures were fed via polymer feeder of K-SFS 24 gravimetric feeding system ex. K-Tron to the main feeding port of the extruder.

The compounding was performed in a twin-screw co-rotating extruder ZE25 with L/D=32 ex Berstorff. The compounding conditions are presented in Table B:

TABLE B

| PARAMETER | UNITS | Set values |
|---|---|---|
| Screws |  | Medium shear A |
| Feeding zone temperature ($T_1$) | ° C. | no heating |
| $T_2$ | ° C. | 170 |

TABLE B-continued

| PARAMETER | UNITS | Set values |
|---|---|---|
| $T_3$ | ° C. | 195 |
| $T_4$ | ° C. | 210 |
| $T_5$ | ° C. | 210 |
| $T_6$ | ° C. | 210 |
| $T_7$ | ° C. | 210 |
| $T_8$ | ° C. | 210 |
| $T_9$ | ° C. | 210 |
| Temperature of melt | ° C. | 205-222 |
| Screw speed | RPM | 350 |
| Feeding rate | Kg/h | 15 |

The extruded strands were then pelletized in pelletizer 750/3 ex Accrapak systems limited. The obtained pellets were dried in a circulating air oven at 75° C. for 4 hours.

Test specimens were prepared by injection molding in Allrounder 500-150 ex. Arburg according to the conditions presented in Table C.

TABLE C

| PARAMETER | UNITS | Set values |
|---|---|---|
| $T_1$ (Feeding zone) | ° C. | 180 |
| $T_2$ | ° C. | 230 |
| $T_3$ | ° C. | 230 |
| $T_4$ | ° C. | 230 |
| $T_5$ (nozzle) | ° C. | 230 |
| Mold temperature | ° C. | 40 |
| Injection pressure | bar | 900 |
| Holding pressure | bar | 250 |
| Back pressure | bar | 20 |
| Injection time | sec | 0.1 |
| Holding time | sec | 10.0 |
| Cooling time | sec | 5.0 |
| Mold closing force | kN | 500 |
| Filling volume (portion) | ccm | 45 |
| Injection speed | ccm/sec | 30 |
| Mold |  | N° S 22963 |

The specimens were then conditioned at 23° C. for 168 hours before testing.

The composition prepared and their flammability characteristics are described in Table 5.

TABLE 5

| | Example | | | |
|---|---|---|---|---|
| | Example 12 | | Example 13 | |
| | FR type | | | |
| | FR-245 | | FR-245 | |
| Composition, wt % | | | | |
| HIPS Styron 1200 | 76.9 | 75.3 | 81.3 | 78.0 |
| FR (masterbatch) | 21.7 | 23.3 | 16.7 | 20.0 |
| Antimony trioxide (AO 112) | 1 (1.3) | | 1.5 (1.9) | |
| PTFE | | 0.1 | | 0.1 |
| Bromine content, % | 13 | 14 | 10 | 12 |
| Flame retardancy UL 94: (thickness 1.6 mm) | | | | |
| Class | V-1 | V-0 | V-1 | V-0 |
| Maximum flaming time, sec | 17 | 6 | 30 | 6 |
| Total flaming time, sec | 61 | 27 | 127 | 23 |
| Number of dripping specimens | 0 | 0 | 0 | 0 |
| Number of specimens igniting cotton | 0 | 0 | 0 | 0 |

Examples 12 and 13 demonstrate that the compositions of the present invention may be conveniently prepared by using FR-245 in a masterbatch form.

Examples 14 and 15

Testing the Efficacy of the Combination of FR-245 and Antimony Trioxide in Different Grades of HIPS The following examples illustrate that the combination of FR-245 and antimony trioxide can be effectively applied for different grades of HIPS. The HIPS tested in examples 14-15 (Styron 485; MFI=12) has higher viscosity and lesser degree of impact strength as compared to the HIPS tested in the previous examples (Styron 1200; MFI=5).

TABLE 6

|  | Example | | | |
|---|---|---|---|---|
|  | Example 14 | | Example 15 | |
| Composition, wt % | | | | |
| HIPS Styron 485 | 79.2 | 77.7 | 83.1 | 81.6 |
| FR 245 | 19.4 | 20.9 | 14.9 | 16.4 |
| Antimony trioxide (AO 112) | 1.0 (1.3) | | 1.5 (1.9) | |
| PTFE | | 0.1 | | 0.1 |
| Bromine content, % | 13 | 14 | 10 | 11 |
| Flame retardancy UL 94: (thickness 1.6 mm) | | | | |
| Class | V-1 | V-0 | V-1 | V-0 |
| Maximum flaming time, sec | 14 | 5 | 15 | 6 |
| Total flaming time, sec | 71 | 22 | 62 | 33 |
| Number of specimens dripping | 0 | 0 | 0 | 0 |
| Number of specimens igniting cotton | 0 | 0 | 0 | 0 |

The results show that the antimony trioxide concentration range of 0.5-1.5 is indeed workable also for HIPS grade with MFI of 12 g/10 min, since the amount of bromine that needs to be supplied by the flame retardant is fairly low.

Examples 16 (Comparative) and 17-18 (of the Invention)

Testing the After Glow Time of HIPS Compositions which are Flame Retarded by the Combination of FR-245 and a Low Amount of Antimony Trioxide This set of examples demonstrate the favorable effect that FR-245 in combination with low amount (especially 1-1.5 wt %) of antimony trioxide has on the total after glow time of the HIPS formulation. The compositions tested are presented in Table 7.

TABLE 7

|  | FR type FR-245 | | |
|---|---|---|---|
|  | Example 16 comparative | Example 17 | Example 18 |
| Composition, wt % | | | |
| HIPS Styron 1200 | 78.0 | 81.6 | 79.2 |
| FR-245 | 16.4 | 16.4 | 19.4 |
| Antimony trioxide (AO 112) | 4.4 (5.5) | 1.5 (1.9) | 1 (1.3) |
| PTFE | 0.1 | 0.1 | 0.1 |

TABLE 7-continued

|  | FR type FR-245 | | |
|---|---|---|---|
|  | Example 16 comparative | Example 17 | Example 18 |
| Total bromine content, % | 11 | 11 | 13 |
| Flame retardancy UL 94: (thickness 1.6 mm) | | | |
| Total after glow, sec | 60 | 0 | 0 |

The results reported above show that compositions prepared according to the invention offer the advantage of shortening and even completely eliminating total after glow times, as measured according to the standard UL 94. In order to get low total after glow times, it is often necessary to use high loading of antimony trioxide or to use other additives increasing significantly the cost of the compositions, such as zinc borates.

Examples 19-22 (of the Invention)

HIPS Compositions which are Flame Retarded by Either FR-1210 or S-8010, in Combination with FR-245, and in the Presence of a Low Amount of Antimony Trioxide In the following set of examples, HIPS compositions which are flame retarded using FR 245 in combination with a brominated flame retarding agent selected from the group consisting of decabromodiphenyl oxide (FR 1210) and decabromodiphenyl ethane (S-8010) were made.

In Examples 19 and 20, blends of FR-245 with FR-1210 were used as FR system for HIPS applications. The blends were prepared in such a way that 50% of the total bromine in the final composition is provided by FR-245 and the other 50% is supplied by FR-1210. The composition and properties of the HIPS resins prepared are given in Table 8. For ease of comparison, the HIPS compositions that are flame retarded with FR-1210 according to Examples 2 and 5 are also included in the table.

TABLE 8

|  | FR type | | | |
|---|---|---|---|---|
|  | FR-245 + FR-1210 | | FR-1210 | |
|  | Example 19 | Example 20 | Example 2 comparative | Example 5 comparative |
| Composition, wt % | | | | |
| HIPS Styron 1200 | 77.1 | 80.5 | 75.7 | 79.9 |
| FR-245 | 11.9 | 9.7 | 0 | 0 |
| FR-1210 | 9.6 | 7.8 | 22.9 | 18.1 |
| Antimony trioxide (AO 112) | 1 (1.3) | 1.5 (1.9) | 1 (1.3) | 1.5 (1.9) |
| PTFE | 0.1 | 0.1 | 0.1 | 0.1 |
| Total bromine content, % (% share of bromine from FR-245) | 16 (50) | 13 (50) | 19 (0) | 15 (0) |
| Flame retardancy UL 94: (thickness 1.6 mm) | | | | |
| Class | V-0 | V-0 | V-0 | V-0 |
| Maximum flaming time, sec | 9 | 9 | 2 | 6 |

TABLE 8-continued

| | FR type | | | |
|---|---|---|---|---|
| | FR-245 + FR-1210 | | FR-1210 | |
| | Example 19 | Example 20 | Example 2 comparative | Example 5 comparative |
| Total flaming time, sec | 28 | 27 | 9 | 22 |
| Number of specimens dripping | 0 | 0 | 0 | 0 |
| Number of specimens igniting cotton | 0 | 0 | 0 | 0 |

Comparative Examples 2 and 5 show that in the case where FR 1210 is the only brominated flame retarding agent used in the HIPS composition, then bromine contents of 19% and 15% (w/w) are needed—in the presence of 1 wt % and 1.5 wt % of antimony trioxide, respectively—in order to reach UL 94 V-0 class. Examples 21 and 22 illustrate that the HIPS compositions can attain UL 94 V-0 rating even when the total bromine content is 16 wt % and 13 wt % and the antimony trioxide is present at concentrations of 1 wt % and 1.5 wt %, respectively, if at least a portion the bromine content is contributed by FR-245 (at the expense of FR 1210).

In Examples 21 and 22, blends of FR-245 with S-8010 were used as FR system for HIPS compositions. In Example 21, the weight ratio between FR 245 and S-8010 in the blend was adjusted such that the total amount of bromine is equally divided between the two components (50:50), whereas in Example 22, the weight ratio FR 245 and S-8010 was adjusted such that the total amount of bromine provided in the composition is proportioned 75:25 (in favor of FR-245). The compositions and properties of the HIPS resins prepared are given in Table 9. For ease of comparison, the HIPS compositions that are flame retarded with S-8010 alone according to comparative Example 3 are also included in the table.

TABLE 9

| | FR type | | |
|---|---|---|---|
| | FR-245 + S-8010 | | S-8010 |
| | Example 21 | Example 22 | Example 3 (comparative) |
| Composition, wt % | | | |
| HIPS Styron 1200 | 74.2 | 77.2 | 76.6 |
| FR-245 | 13.4 | 16.8 | 0 |
| S-8010 | 11.0 | 4.6 | 22.0 |
| Antimony trioxide (AO 112) | 1.0 (1.3) | 1.0 (1.3) | 1 (1.3) |
| PTFE | 0.1 | 0.1 | 0.1 |
| Total bromine content, % (% share of bromine from FR-245) | 18 (50) | 15 (75) | 18 (0) |
| Flame retardance UL 94: (thickness 1.6 mm) | | | |
| Class | V-0 | V-0 | HB |
| Maximum flaming time, sec | 1 | 9 | 39 |
| Total flaming time, sec | 9 | 42 | 97 |
| Number of specimens dripping | 0 | 0 | 2 |
| Number of specimens igniting cotton | 0 | 0 | 2 |
| Number of specimens burned up to the clamp | 0 | 0 | 0 |

Comparative Example 3 shows that in the case where S-8010 is the sole brominated flame retarding agent used in the HIPS composition, then a bromine content of 18% (w/w) does not suffice—in the presence of only 1 wt % of antimony trioxide—in order to pass the UL 94 test. Examples 21 and 22 illustrate compositions qualifying as UL 94 V-0, despite the fact the total bromine content is 18% by weight or less and antimony trioxide is present at a low concentration of 1% by weight. The compositions of Examples 21 and 22 pass the UL 94 V-0 test because at least a portion of the bromine content of the composition is contributed by FR-245. Thus, S-8010-containing HIPS compositions can benefit from the inclusion of FR 245 in conjunction with S-8010, allowing a reduced level of antimony trioxide.

Examples 23, 24, 26-29 (of the Invention) and 25 (Comparative)

HIPS Compositions which are Flame Retarded by F 3014 or F 2016, in Combination with FR-245, and in the Presence of a Small Amount of Antimony Trioxide In the following set of examples, HIPS compositions are flame retarded using FR 245 in combination with a brominated flame retarding agent selected from the group represented by Formula (III).

In Examples 23 and 24, the activity of the combination of FR-245 and F 3014 was tested in HIPS compositions in the presence of only 1 wt % of antimony trioxide and 0.1 wt % of PTFE in order to determine whether UL 94 V-0 compositions are attainable under such conditions. The weight ratio between the two brominated flame retarding agents was suitably adjusted such that the total bromine content was equally assigned (Example 23) or was proportioned 75:25 in favor of FR-245 (Example 24). The results are shown in Table 10.

TABLE 10

| | FR type | | | |
|---|---|---|---|---|
| | FR-245 + F 3014 | | | F 3014 |
| | Example 23 | Example 24 | FR 245 Example 1 | Example 25 (comparative) |
| Composition, wt % | | | | |
| HIPS Styron 1200 | 77.7 | 78.4 | 76.2 | 64.1 |
| FR-245 | 9.7 | 14.6 | 22.4 | 0 |
| F 3014 | 11.2 | 5.6 | 0 | 34.5 |
| Antimony trioxide (AO 112) | 1.0 (1.3) | 1.0 (1.3) | 1.0 (1.3) | 1.0 (1.3) |
| PTFE | 0.1 | 0.1 | 0.1 | 0.1 |
| Total bromine content, % (% share of bromine from FR-245) | 13 (50) | 13 (75) | 15 (100) | 20 (0) |
| Flame retardance UL 94: (thickness 1.6 mm) | | | | |
| Class | V-0 | V-0 | V-0 | HB* |
| Maximum flaming time, sec | 6 | 9 | 3 | 50 |
| Total flaming time, sec | 35 | 35 | 16 | |
| Number of specimens dripping | 0 | 0 | 0 | 2 |
| Number of specimens igniting cotton | 0 | 0 | 0 | 2 |
| Number of specimens burned up to the clamp | 0 | 0 | | 2 |

*two specimens were tested

The results indicate that the combination of FR-245 and F-3014 exhibits a synergistic effect in HIPS-based formulations containing a low amount (less than 2.0 wt %, e.g., between 0.5 and 1.5 wt %) of antimony trioxide.

In Examples 26 and 27, the activity of the combination of FR-245 and F 3014 was tested in HIPS compositions in the presence of only 1 wt % of antimony trioxide and 0.1 wt % of PTFE, this time in order to provide compositions meeting the UL 94 V-1 rating. In Example 26, the weight ratio between FR 245 and F 3014 in the blend was adjusted such that the total amount of bromine is equally divided between the two components (50:50), whereas in Example 27, the weight ratio FR 245 and F 3014 was adjusted such that the total amount of bromine provided in the composition is proportioned 75:25 (in favor of FR-245). Example 25, in which F 3014 is used alone, is again included for the purpose of comparison. The compositions and properties of the HIPS resins prepared are given in Table 11.

TABLE 11

| | FR type | | |
|---|---|---|---|
| | FR-245 + F 3014 | | F 3014 |
| | Example 26 | Example 27 | Example 25 comparative |
| Composition, wt % | | | |
| HIPS Styron 1200 | 79.3 | 80.0 | 64.1 |
| FR-245 | 9.0 | 13.4 | 0 |
| F 3014 | 10.3 | 5.2 | 34.5 |
| Antimony trioxide (AO 112) | 1.0 (1.3) | 1.0 (1.3) | 1.0 (1.3) |
| PTFE | 0.1 | 0.1 | 0.1 |
| Total bromine content, % (% share of bromine from FR-245) | 12 (50) | 12 (75) | 20 |
| Flame retardance UL 94: (thickness 1.6 mm) | | | |
| Class | V-1* | V-1 | HB** |
| Maximum flaming time, sec | 16 | 16 | 50 |
| Total flaming time, sec | 77 | 99 | |
| Number of specimens dripping | 0 | 0 | 2 |
| Number of specimens igniting cotton | 0 | 0 | 2 |
| Number of specimens burned up to the clamp | 0 | 0 | 2 |

*five specimens were tested
**two specimens were tested

Comparative Example 25 demonstrates that antimony trioxide at a concentration of 1.0% by weight cannot effectively support the action of F 3014 when the latter is the only flame retardant present in the composition. In contrast, Examples 26 and 27 illustrate that the combination of FR 245 and F 3014 is highly efficient in the presence of only 1.0 wt % of antimony trioxide, with the resulting composition meeting the UL 94 V-1 test. Similar results were obtained when the concentration of antimony trioxide in the HIPS composition was 1.5 wt %.

Examples 28 and 29 illustrate the activity of the combination of FR-245 and F 2016 in HIPS compositions in the presence of only 1 wt % of antimony trioxide (and 0.1 wt % of PTFE). In both of the examples, the weight ratio between the two brominated flame retarding agents was suitably adjusted such that the total bromine content was equally divided between the FR-245 and F 2016. The compositions and the results of the flammability tests are described in the Table 12.

TABLE 12

| | FR type | |
|---|---|---|
| | FR-245 + F-2016 | |
| | Example 28 | Example 29 |
| Composition, wt % | | |
| HIPS Styron 1200 | 79.4 | 77.6 |
| FR-245 | 8.2 | 9.0 |
| F-2016 | 11.0 | 12.0 |
| Antimony trioxide (AO 112) | 1.0 (1.3) | 1.0 (1.3) |
| PTFE | 0.1 | 0.1 |
| Total bromine content, % (% share of bromine from FR-245) | 11 (50) | 12 (50) |
| Flame retardance UL 94: (thickness 1.6 mm) | | |
| Class | V-1 | V-0 |
| Maximum flaming time, sec | 12 | 5 |
| Total flaming time, sec | 48 | 19 |
| Number of specimens dripping | 0 | 0 |
| Number of specimens igniting cotton | 0 | 0 |
| Number of specimens burned up to the clamp | 0 | 0 |

The results reported in Table 12 indicate the combination of FR 245 and F 2016 performs surprisingly well in retarding the flammability of HIPS composition having only low antimony trioxide content, allowing the compositions to satisfy the UL 94 V-1 or V-0 ratings with modest bromine levels of 11% and 12% by weight, respectively. Notably, mixtures of FR 245 and F 2016 appear to afford better flame retardancy when compared to either FR 245 or F 2016 alone.

Example 30 (Comparative), Examples 31-32 (of the Invention) and 33 (Comparative)

FR-245 and FR-1210 were incorporated into ABS formulations according to the general procedures described above, in order to evaluate their activity in the presence of 1.5 wt % antimony trioxide. The compositions prepared and the properties measured are summarized in Table 13 below.

TABLE 13

| | FR type | | | |
|---|---|---|---|---|
| | FR-245 | | | FR-1210 |
| | Example 30 | Example 31 | Example 32 | Example 33 |
| Composition, wt % | | | | |
| ABS Magnum 342EZ (MFI 8) | 78.3 | 81.6 | 80.1 | 83.5 |
| FR | 14.3 | 16.4 | 17.9 | 14.5 |
| Antimony trioxide (AO 112) | 6 (7.5) | 1.5 (1.9) | | 1.5 (1.9) |
| PTFE | | 0.1 | | 0.1 |
| Bromine content, % | 9.6 | 11 | 12 | 12 |
| Flame retardancy UL 94: (thickness 1.6 mm) | | | | |
| Class | V-0 | V-1 | V-0 | V-2 |
| Total flaming time, sec | 15 | 56 | 6 | 95 |

Usually flame-retarded ABS compositions for class V-1 and V-0 according to UL 94, with thickness 1.6 mm, contain 4 to 6% antimony trioxide and 10 to 12% bromine provided by brominated fire retardants. It is surprising to get the same fire retardancy levels while using less than half the loading of antimony trioxide with the use of very similar loadings of FR-245 while with other FRs, such as decabromodiphenyl oxide, which is also recommended for this application, significantly more bromine is needed.

Examples 34 (of the Invention) and 35 (Comparative)

PC/ABS Compositions which are Flame Retarded by FR 245 in the Presence of a Low Amount of Antimony Trioxide (1.0 Wt %)

The activity of FR-245 and S-8010 was tested also in PC/ABS compositions (PC Makrolon 1143 and ABS Magnum 3404 in a weight ratio of 1:1).

The preparative procedure was as follows. The polymers were dried before the compounding (PC at 120° C. and ABS at 75° C., both for a period of four hours). The various components were weighted and mixed in plastic bag. The mixtures were fed via Accurate feeder to the main feeding port of the extruder. The compounding was performed in co-rotating twin-screw extruder with L/D=32 (Berstoff) according to the following conditions:

| PARAMETER | UNITS | Set values |
|---|---|---|
| Screw type | | Medium shear A |
| Feeding zone temperature ($T_1$) | ° C. | no heating |
| $T_2$ | ° C. | 170 |
| $T_3$ | ° C. | 220 |
| $T_4$ | ° C. | 250 |
| $T_5$ | ° C. | 250 |
| $T_6$ | ° C. | 250 |
| $T_7$ (vented) | ° C. | 250 |
| $T_8$ | ° C. | 250 |
| $T_9$ | ° C. | 250 |
| Melt temperature | ° C. | 250-260 |
| Screw speed | RPM | 350 |
| Feeding rate | Kg/h | 18-19 |

The strands obtained were pelletized and the pellets were dried in a circulating air oven at 110° C. for four hours.

Test specimens were then prepared by injection molding in Allrounder 500-150 (Arburg) under the following conditions:

| PARAMETER | UNITS | Set values |
|---|---|---|
| $T_1$ (Feeding zone) | ° C. | 230 |
| $T_2$ | ° C. | 250 |
| $T_3$ | ° C. | 250 |
| $T_4$ | ° C. | 250 |
| $T_5$ (nozzle) | ° C. | 260 |
| Mold temperature | ° C. | 80 |
| Injection pressure | bar | 1000 |
| Holding pressure | bar | 600 |
| Back pressure | bar | 10 |
| Injection time | sec | 0.1 |
| Holding time | sec | 10 |
| Cooling time | sec | 10 |
| Mold closing force | kN | 500 |
| Filling volume (portion) | ccm | 25 |
| Injection speed | ccm/sec | 800 |
| Mold | | N° S 18572 |

The specimens were conditioned at 23° C. for 168 hours and were then tested according to the UL 94 standard.

The compositions made and the results obtained are described in the following table.

TABLE 14

| | FR type | |
|---|---|---|
| | FR-245 Example 34 | S-8010 Example 35 |
| Composition, wt % | | |
| PC Makrolon 1143 | 43.35 | 44.4 |
| ABS Magnum 3404 | 43.35 | 44.4 |
| FR | 11.9 | 9.8 |
| Antimony trioxide MO 112 | 1.0 (1.3) | 1.0 (1.3) |
| PTFE | 0.1 | 0.1 |
| Bromine content, % | 8 | 8 |
| Flame retardancy UL 94: (thickness 1.6 mm) | | |
| Class | V-0 | V-2 |
| Maximal flaming time, sec | 1 | 8 |
| Total flaming time, sec | 5 | 53 |
| Number of specimens dripping | 0 | 2 |
| Number of specimens igniting cotton | 0 | 2 |

The results illustrate the superiority of FR 245 over S 8010 also for PC/ABS compositions, which contain a low amount (1 wt %) of antimony trioxide.

The invention claimed is:

1. A flame-retarded styrene-containing polymer composition, which comprises a styrene-containing polymer at a concentration of not less than 50 wt %, said polymer being selected from the group consisting of High Impact Polystyrene (HIPS) and acrylonitrile butadiene styrene copolymer (ABS), 0.5-1.5 wt % antimony trioxide, tris(2,4,6-tribromophenoxy)-s-triazine and an anti-dripping agent, wherein the bromine content of the composition provided by said tris(2,4,6-tribromophenoxy)-s-triazine, $\{\text{Bromine}_{(FR-245)}\}$, is in the range between 8 and 18 wt %, and when the styrene-containing polymer is high impact polystyrene (HIPS), then said $\text{Bromine}_{(FR-245)}$ is related to the weight concentration of said antimony trioxide $\{[Sb_2O_3]\}$ by the following inequalities:

$$\text{Bromine}_{(FR-245)} \geq -4 \times [Sb_2O_3]+15, \text{ for } 1.0 \leq [Sb_2O_3] \leq 1.5 \quad \text{(i)}$$

$$\text{Bromine}_{(FR-245)} \geq -10 \times [Sb_2O_3]+21, \text{ for } 0.5 \leq [Sb_2O_3] < 1.0 \quad \text{(ii)}$$

with the percentages being by weight relative to the total weight of the flame-retarded styrene-containing polymer composition, wherein the composition meets a UL 94 rating of V-1 or V-0.

2. The composition according to claim 1, wherein the anti-dripping agent is polytetrafluoroethylene, which is present in an amount between 0.025 and 0.4 wt %.

3. The flame-retarded styrene-containing polymer composition according to claim 1, wherein the concentration of antimony trioxide is in the range between 0.8 and 1.5 wt %.

4. The flame-retarded styrene-containing polymer composition according to claim 3, wherein the concentration of antimony trioxide is in the range between 1.0 and 1.5 wt %.

5. The flame-retarded styrene-containing polymer composition according to claim 4, which comprises High Impact Polystyrene (HIPS), wherein the bromine content {Bromine$_{(FR-245)}$} of the composition is not more than 13 wt %, said bromine content being related to the concentration of antimony trioxide as follows:

$$\text{Bromine}_{(FR-245)} \geq -4 \times [Sb_2O_3] + 15, \text{ for } 1.0 \leq [Sb_2O_3] \leq 1.5 \quad \text{(i)}.$$

6. The flame-retarded styrene-containing polymer composition according to claim 5, wherein the bromine content {Bromine$_{(FR-245)}$} of the composition is not more than 12 wt %.

7. The flame retarded styrene-containing polymer composition according to claim 1, which comprises acrylonitrile-butadiene-styrene copolymers (ABS), wherein the bromine content of the composition provided by tris(2,4,6-tribromophenoxy)-s-triazine is in the range between 9 and 15 wt %.

8. A process for preparing a composition as defined claim 1, which comprises providing a masterbatch containing tris (2,4,6-tribromophenoxy)-s-triazine and optionally antimony trioxide, and processing said masterbatch with the styrene-containing polymer, the anti-dripping agent and also antimony trioxide if the latter is not present in said masterbatch, such that the concentration of the antimony trioxide within the resultant composition is in the range between 0.5 and 1.5 wt %.

9. The process according to claim 8, wherein the antimony trioxide is at least partially included within the masterbatch.

10. A masterbatch composition suitable for a preparation of styrene-containing polymeric compositions, said masterbatch comprising:
 (i) not less than 50 wt % of tris(2,4,6-tribromophenoxy)-s-triazine;
 (ii) antimony trioxide; and
 (iii) a polymer carrier;
 wherein a weight ratio between the total bromine content of said masterbatch and antimony trioxide is not less than 7.

11. The masterbatch composition according to claim 10, wherein the concentration of the antimony trioxide is between 1 and 7 wt % relative to the total weight of the masterbatch.

12. A flame-retarded styrene-containing polymer composition, which comprises a styrene-containing polymer at a concentration of not less than 50% wt %, said polymer being selected from the group consisting of High Impact Polystyrene (HIPS) and acrylonitrile butadiene styrene copolymer (ABS), 0.5-1.5 wt % of antimony trioxide, an anti-dripping agent, tris(2,4,6-tribromophenoxy)-s-triazine and at least one additional brominated flame retarding agent, wherein the total bromine content of the composition is in the range between 11 and 18 wt %, with the percentages being by weight relative to the total weight of the flame-retarded composition, wherein the composition meets a UL 94 rating of V-1 or V-0.

13. The flame-retarded composition according to claim 12, wherein the anti-dripping agent is polytetrafluoroethylene, which is present in an amount between 0.025 and 0.4 wt %.

14. The flame-retarded composition according to claim 12, in which the concentration of antimony trioxide is in the range between 1.0-1.5 wt %.

15. The flame-retarded styrene-containing polymer composition according to claim 12, wherein tris (2,4,6-tribromophenoxy)-s-triazine provides between 40 and 90 wt % of the total bromine content of the composition.

16. The flame-retarded composition according to claim 12, wherein the additional brominated flame retarding agent is represented by formula II:

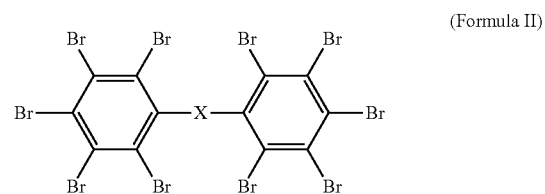

(Formula II)

wherein X is —O— or —CH$_2$—CH$_2$— (for decabromodiphenyl oxide and decabromodiphenyl ethane, respectively), wherein the total bromine content of the composition is in the range between 13 and 18 wt %, with the ratio between the amounts of bromine provided by tris (2,4,6-tribromophenoxy)-s-triazine and the flame retardant of Formula II being in the range between 1:1 and 4:1.

17. The flame-retarded composition according to claim 12, wherein the additional brominated flame retarding agent is selected from the group consisting of the brominated epoxy oligomers and their end-capped derivatives of formula (III):

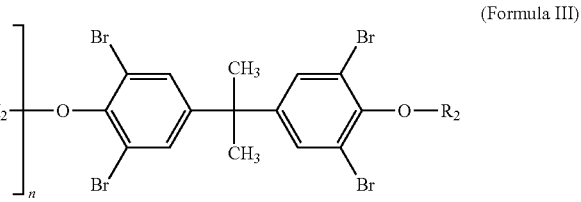

(Formula III)

wherein n, the degree of polymerization, is an integer in the range between 0 and 100, and R$_1$ and R$_2$ are independently selected from the group consisting of the following monovalent radicals:

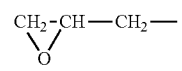

-continued

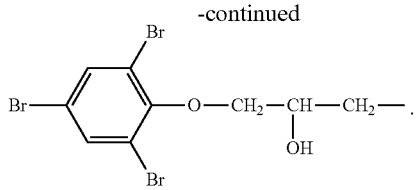

18. The flame retarded composition according to claim 17, wherein the flame retarding agent of formula III is provided in the form of a mixture comprising the individual end-capped derivatives represented by Formula (IIIa):

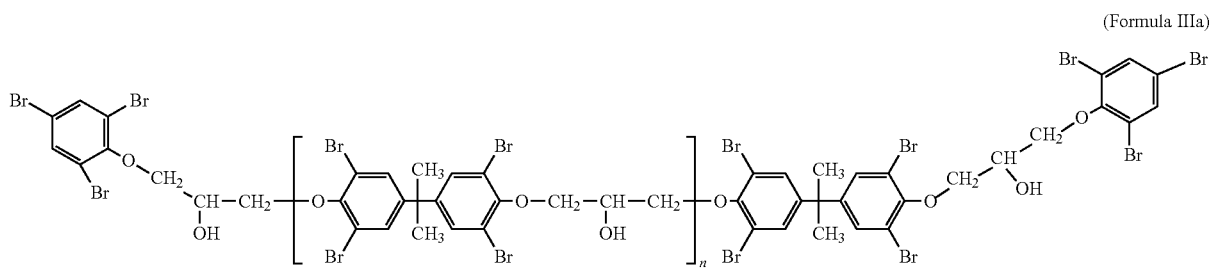

(Formula IIIa)

wherein n equals 0, 1, 2, 3, or 4, and wherein the total bromine content of the composition is in the range between 11 and 13 wt %, with the ratio between the amounts of bromine provided by tris(2,4,6-tribromophenoxy)-s-triazine and by the flame retarding agent of formula Ma being in the range between 1:1 and 4:1.

19. The flame retarded composition according to claim 17, wherein the flame retarding agent of formula III is provided in the form of a mixture of epoxy resins represented by the Formula (IIIb):

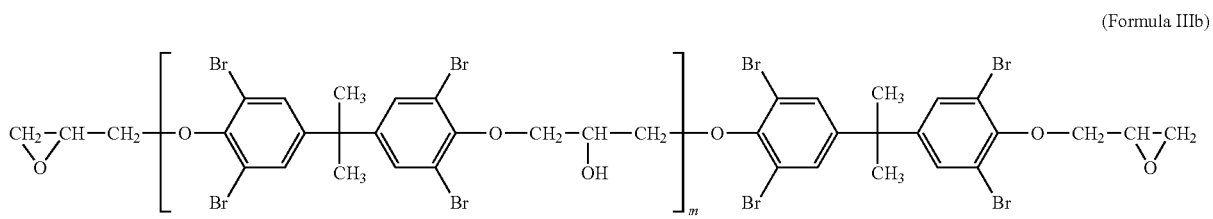

(Formula IIIb)

wherein m, the weight-average degree of polymerization, is in the range between 0 and 100, said flame-retarding agent having an average epoxy equivalent weight in the range between 400 and 3000 g/eq.

20. The flame retarded composition according to claim 19, wherein the total bromine content of the composition is in the range between 11 and 13 wt %, with the ratio between the amounts of bromine provided by tris(2,4,6-tribromophenoxy)-s-triazine and by the flame retarding agent of formula IIIb being in the range between 1:1 and 4:1.

21. A thermoplastic article formed from the composition of claim 1.

* * * * *